US008145869B2

(12) United States Patent
Sargeant et al.

(10) Patent No.: US 8,145,869 B2
(45) Date of Patent: Mar. 27, 2012

(54) DATA ACCESS AND MULTI-CHIP CONTROLLER

(75) Inventors: Matthew G. Sargeant, Westford, MA (US); Michael A. Kahn, Hudson, MA (US); Francis J. Stifter, Jr., Hampton Falls, NH (US); Jason P. Colangelo, Lowell, MA (US)

(73) Assignee: Broadbus Technologies, Inc., Boxborough, MA (US)

( * ) Notice: Subject to any disclaimer, the term of this patent is extended or adjusted under 35 U.S.C. 154(b) by 782 days.

(21) Appl. No.: 11/652,931

(22) Filed: Jan. 12, 2007

(65) Prior Publication Data

US 2012/0005396 A1  Jan. 5, 2012

(51) Int. Cl.
*G06F 12/00* (2006.01)
(52) U.S. Cl. .............................. 711/168; 711/E12.044
(58) Field of Classification Search .................... None
See application file for complete search history.

(56) References Cited

U.S. PATENT DOCUMENTS

| | | | |
|---|---|---|---|
| 6,854,043 B2 * | 2/2005 | Hargis et al. | 711/168 |
| 6,968,419 B1 * | 11/2005 | Holman | 711/5 |
| 2004/0117566 A1 * | 6/2004 | McClannahan et al. | 711/154 |
| 2006/0129767 A1 | 6/2006 | Berenyi et al. | |
| 2006/0149872 A1 | 7/2006 | Natarajan et al. | |
| 2006/0179213 A1 * | 8/2006 | Brittain et al. | 711/105 |
| 2006/0248253 A1 * | 11/2006 | Wang | 710/306 |

FOREIGN PATENT DOCUMENTS

| | | |
|---|---|---|
| CN | 88102351 | 3/1988 |
| CN | 1703685 | 11/2005 |
| EP | 0289771 | 3/1988 |
| WO | 2004029816 | 4/2004 |
| WO | 2007005693 | 1/2007 |

OTHER PUBLICATIONS

Office Action, Korean App. No. 10-2008-0004098 (Foreign Text), Sep. 21, 2009.
Office Action, Korean App. No. 10-2008-0004098 (English Translation), Oct. 12, 2009.
Cited Reference WO 2004/029816 (Foreign Text and English Translation), Apr. 8, 2004.
Cited Reference KORS 2005-0051672 (Foreign Text), Jun. 1, 2005.
Office Action, Japanese App. No. 2008-005305 (Foreign Text and English Translation), Feb. 15, 2011.

(Continued)

*Primary Examiner* — Reginald Bragdon
*Assistant Examiner* — Aracelis Ruiz
(74) *Attorney, Agent, or Firm* — Stewart M. Wiener

(57) ABSTRACT

A single data bus to a memory device can be split up into a number of data bus portions, each of which is managed by a different respective controller chip of multiple controller chips. During a memory access to a respective memory device, each of the multiple controller chips controls a different corresponding portion of the data bus to retrieve data from or store data to the memory device depending on whether the access is a read or write. To perform the data access, a synchronizer circuit (internal and/or external to the memory controller chips) synchronizes the multiple memory controller chips such that one of the memory controller chips drives the address bus and/or control signals to the memory device. After setting the address to the memory device, the memory controller chips either read data from or write data to the memory device based on the address.

12 Claims, 6 Drawing Sheets

OTHER PUBLICATIONS

Office Action, Korean Patent Application No. 10-2008-4098 (foreign text), Dec. 27, 2010.
Office Action, Korean Patent Application No. 10-2008-4098 (english translation), Dec. 27, 2010.
Office Action, Chinese Patent Application No. 200810002667 (foreign text), Sep. 4, 2009.
Office Action, Chinese Patent Application No. 200810002667 (english translation), Nov. 4, 2010.
Office Action, Chinese Patent Application No. 200810002667 (foreign text), Nov. 4, 2010.
Office Action, Chinese Patent Application No. 200810002667 (english translation), Sep. 4, 2009.
European Search Report, EPC Application No. 08000562, May 7, 2008.
Communication Pursuant to Article 94(3)EPC, EPC Application No. 08000562.2, Mar. 9, 2009.
Communication Pursuant to Article 94(3)EPC, EPC Application No. 08000562.2, Oct. 10, 2011.

* cited by examiner

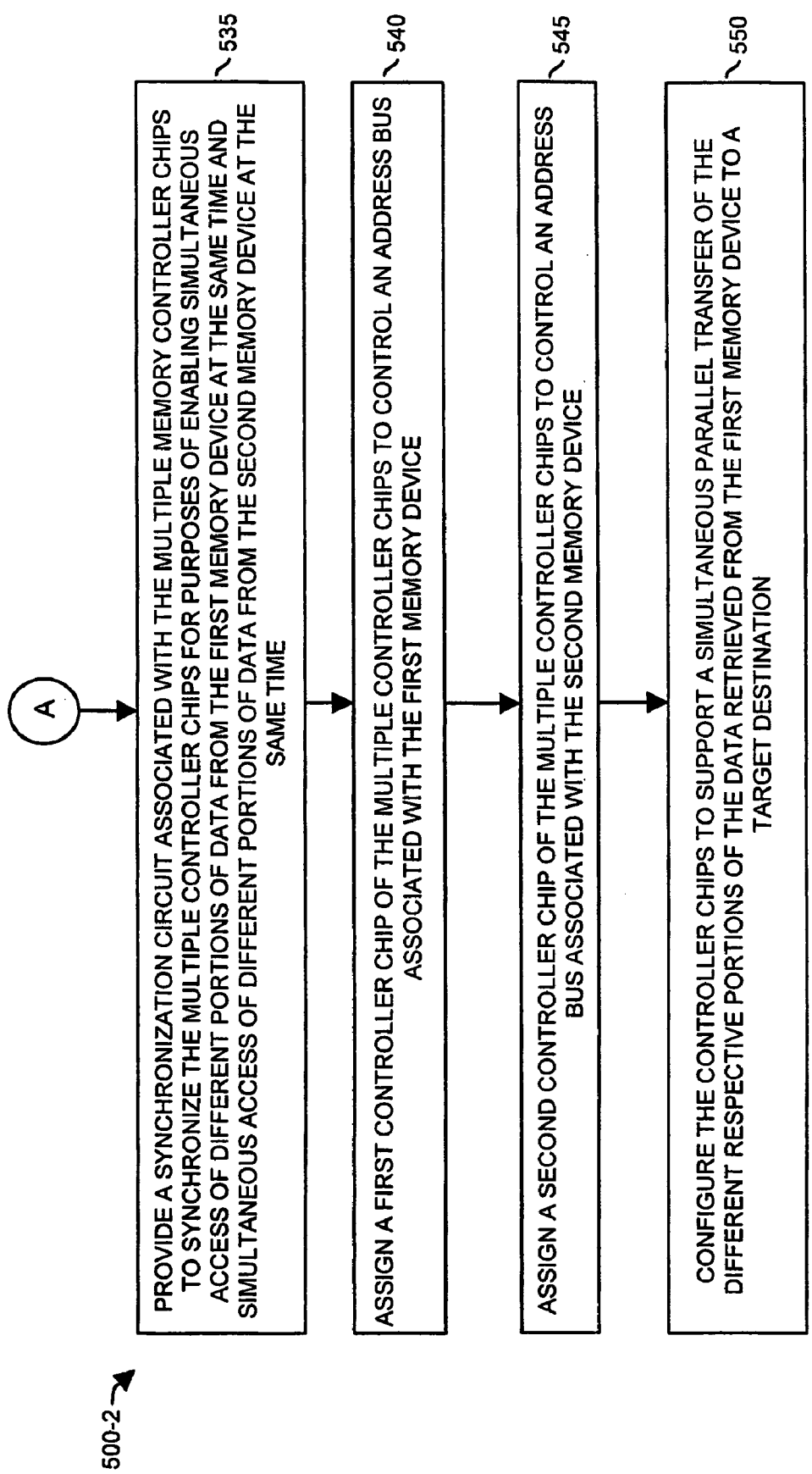

DATA ACCESS AND MULTI-CHIP CONTROLLER

BACKGROUND

Conventional memory architectures used in computing platforms rely on use of two elements: a memory controller and one or more memory modules that stores data accessed by the memory controller. In many conventional applications, the memory modules are typically industry standard memory modules having electrical interfaces, protocols, and mechanical fit and form defined by JEDEC (Joint Electronic Devices Engineering Council), a standards body.

As memory performance has improved over time, corresponding interface speeds between the memory controller and corresponding modules have also increased. Corresponding signaling voltages of the interfaces have decreased over time. Each performance improvement thus makes printed circuit board design (e.g., layout of traces connecting pins of each component) more challenging. That is, trace layouts tend to be more difficult for each memory speed improvement.

The JEDEC standards committee has acknowledged this increasing difficulty by incorporating (into the memory standards) a reduction in size of the maximum acceptable physical trace lengths and reduction of a number of cohabiting memory modules connected to the same access interface. Both of these changes reduce overall signal loading for a respective trace so that high access speeds are possible.

SUMMARY

As discussed above, there are deficiencies associated with the conventional memory architectures. For example, the above trend (e.g., higher interface speeds and lower signaling voltages) makes it difficult and costly, if not impossible, to implement large system memory applications using conventional memory controller approaches. That is, if a single large memory controller chip is used to interface to a large number of memory modules, a multitude of independent memory interfaces (e.g., data buses, address lines, control lines, etc.) is typically required to access information stored in the memory device. Under normal circumstances, a respective interface can only access information from only one or possibly up to two memory modules because of loading problems with respect to traces between the controller and memory module.

According to conventional architectures, routing from a single controller chip to eight or sixteen distinct memory module chips can require a complex intertwining of very long trace lengths (on many layers on a respective printed circuit board) between the memory controller chip and the memory device. This is often problematic because implementing long intertwining printed circuit board trace lengths can degrade corresponding signal integrity, increasing the likelihood of an access failure by the memory controller. This also adds to the cost of the board—e.g. development cost, product cost, reduces yield. As mentioned above, these are strict standards defining acceptable load values associated with the traces.

Techniques discussed herein deviate with respect to conventional applications such as those discussed above as well as additional techniques known in the prior art. For example, certain specific embodiments herein are directed to overcoming deficiencies associated with the above-mentioned techniques and/or other deficiencies in the prior art not discussed above.

In general, embodiments herein reduce the burden of laying out traces on a printed circuit board by breaking up one or more memory interface(s) (e.g., one or more data buses, address buses, control signals, etc.) across multiple coordinated memory controller chips (e.g., independent integrated circuits). For example, a single data bus to a memory device can be split up into a number of data bus portions (e.g., groups of signals), each of which is managed by a different respective controller chip. Accordingly, during a memory access to a respective memory device, each of multiple controller chips can control a different corresponding portion of the data bus to retrieve or store data depending on whether the access is a read or write.

In one embodiment, in order to perform a respective data access, a synchronizer circuit (internal and/or external to the memory controller chips) can synchronize the multiple memory controller chips such that either one or a number of the memory controller chips drives the address bus and/or control signals to the memory device. After setting the address to the memory device for an appropriate time, the memory controller chips simultaneously either (e.g., latch) read data or provide write data to the memory device based on the address. The synchronizer circuit coordinates timing amongst the multiple chip controllers to carry out such operations.

In addition to splitting a data bus and allocating each of the memory controller chips to control a respective portion of a single data bus, each of the controllers can be configured to control a portion of each of multiple data buses to different memory devices. In other words, a first data bus to a first memory device can be split up into data bus portions, each of which are controlled by a respective one of the multiple controller chips. A second data bus to a corresponding second memory device can be split up into another set of data bus portions, each of which are controlled by a respective one of the multiple controller chips. In such an embodiment, each of the memory controller chips can be configured to drive a respective address bus and/or corresponding control signals for each memory device. Thus, during operation, one of the memory controllers can drive an address to a respective memory device being accessed while each of the multiple memory controller chips accesses a different portion of the data stored in the accessed memory device.

In furtherance of the above embodiments, one embodiment involves physically locating the memory controller chips (e.g., memory controller devices) in a linear manner along a respective layout axis that is parallel with respect to the axis of the memory device. Such an embodiment can include splitting the distributed signals evenly across the multiple controllers based on physical location of the signals (rather than by assigned bit number values, etc.). In other words a physical distribution of portions of the data bus across a linear array of memory controllers can be based on signal/pin assignments of the corresponding memory module (or memory modules as the case may be). When so implemented, creation of "straight shots" (e.g., substantially orthogonal trace paths) between each of the multiple memory controller chips and the memory device reduces overall trace lengths and a need for an exorbitant number of printed circuit board layers to provide the appropriate connectivity between the memory controller chips and the one or more memory devices.

Embodiments herein contrast with conventional applications. For example, the techniques herein provide simple routing channels between a set of memory controller chips and a corresponding memory device. This allows fewer circuit board layers to be used and for more direct interconnect paths, both of which improve the signal integrity of the access interfaces and reduce production costs. Moreover, unlike conventional techniques, embodiments herein allow additional modules to be included in the memory array increasing the memory capacity of the system over what a standard memory system architecture would normally be able to achieve. Simpler routing (via implementation of the multi-chip controller techniques as discussed herein) frees up printed circuit board layer resources for other functionality.

As discussed above, techniques herein are well suited for use in memory systems. However, it should be noted that embodiments herein are not limited to use in such applications and that the techniques discussed herein are well suited for other applications as well. Note that each of the different features, techniques, configurations, etc. discussed herein can be executed independently or in combination.

Note that this summary does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure.

BRIEF DESCRIPTION OF THE DRAWINGS

The foregoing and other objects, features and advantages of the present application will be apparent from the following more particular description of preferred embodiments, as illustrated in the accompanying drawings in which like reference characters refer to the same parts throughout the different views. The drawings are not necessarily to scale, with emphasis instead being placed upon illustrating example embodiments, principles and concepts.

FIGS. 5 and 6 combine to form a flowchart illustrating techniques of producing a memory system including multiple memory controller chips according to an embodiment herein.

DETAILED DESCRIPTION

According to one embodiment, a data bus to a memory device can be split up into a number of data bus portions, each of which is managed by a different respective controller chip of a set of multiple synchronized controller chips. During a memory access to the memory device, each of the multiple controller chips controls a different corresponding portion of the data bus to retrieve data from or store data to the memory device depending on whether the access is a read or write. To coordinate the data access, a synchronizer circuit (internal and/or external to the memory controller chips) synchronizes the multiple memory controller chips such that one of the memory controller chips drives the address bus and/or control signals to the memory device. After setting the address to the memory device, each of the multiple memory controller chips either latch read data from or provide write data to a respective portion of the memory device.

Figure 1:
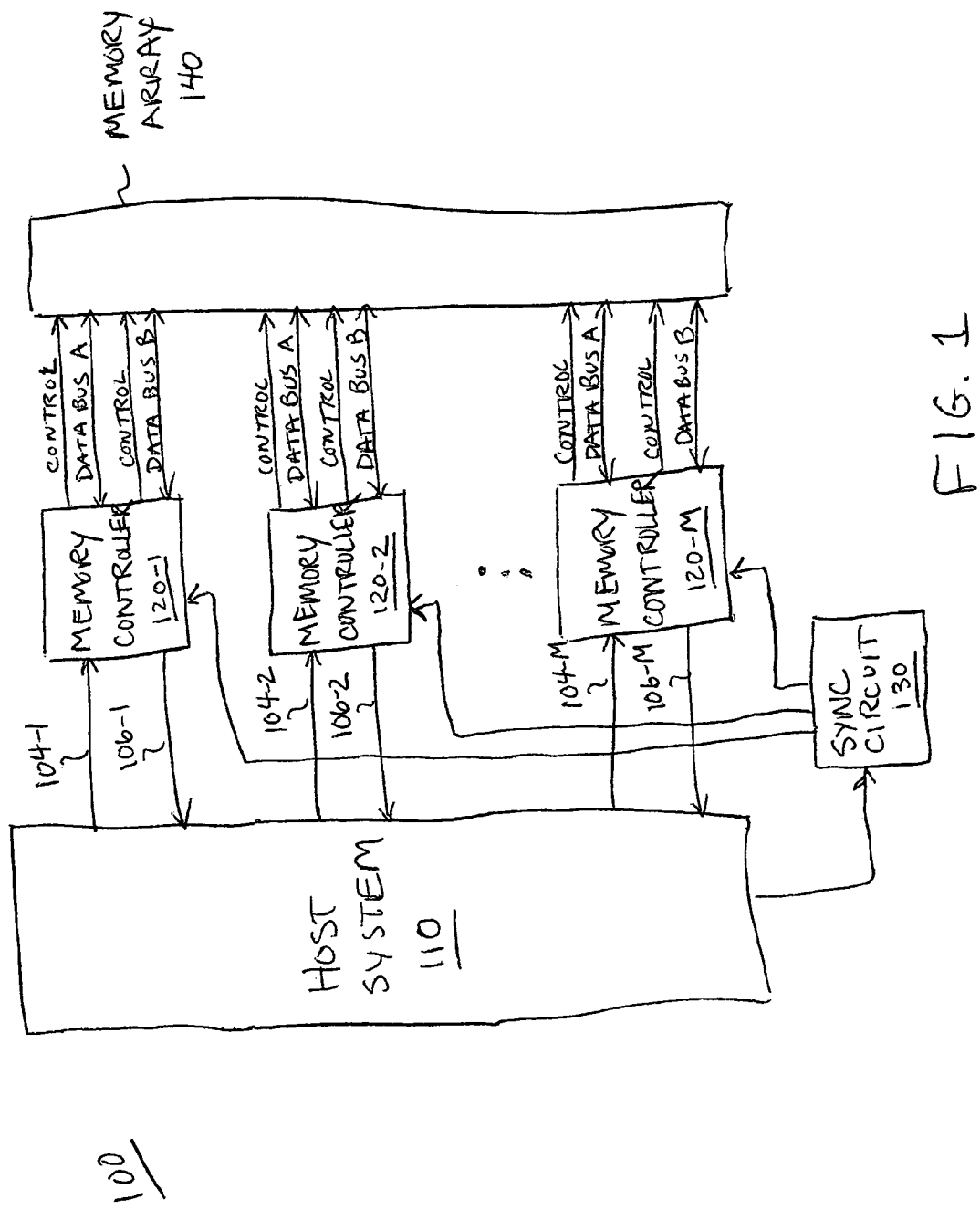
FIG. 1 is a block diagram of a memory system according to an embodiment herein.

FIG. 1 is a diagram of memory system 100 according to embodiments herein. As shown, memory system 100 includes host system 110 (e.g., a data processing system), memory controllers 120 (e.g., memory controller 120-1, memory controller 120-2, . . . , memory controller 120-M), synchronization circuit 130, and memory array 140 (e.g., Dynamic/Random Access Memory Modules). Host system 110 can provide input commands and/or data to memory controllers 120 via signals 104 (e.g., signals 104-1, signals 104-2, . . . , signals 104-M). Host system 110 can receive data from memory controllers via signals 106 (e.g., signals 106-1, signals 106-2, . . . , signals 106-M).

In general, during operation, host system 110 issues commands to and exchanges data with the set of memory controllers 120. For example, via signals 104, host system 110 can specify a location for retrieving data (e.g., bits, words, and/or segments of data) from memory array 140. In response to issuing a request, after an access by the multiple memory controllers 120, memory system 100 receives data from memory controllers 120 via signals 106.

Each of the memory controllers 120 can include multiple respective interfaces (e.g., data bus and/or corresponding control lines) to memory array 140 such as data bus A and data bus B. As will be discussed later in this specification, data bus A can provide access to a first memory device in memory array 140 while data bus B can provide access to a second memory device in memory array 140. Data can be accessed via use of the respective data buses at the same or different times. Respective interconnects such as data bus A and data bus B between the memory controllers 120 and the memory array 140 can be implemented via traces (or other medium) on one or more printed circuit boards between corresponding electronic devices (e.g., memory controllers 120 and memory array 140).

As mentioned above, each memory controller 120 controls a respective portion of data bus A and data bus B for purposes of accessing data from memory array 140. Synchronization circuit 130 of memory system 100 coordinates operation of the memory controllers 120 such that the memory controllers 120 can simultaneously access data from memory array 140. In other words, via synchronization provided by synchronization circuit 130, one or more memory controllers 120 sets the appropriate control lines to memory array 140 while each of the multiple memory controllers 120 accesses portions of data via use of a respective portion of the data bus.

Although depicted as an external resource to the memory controllers 120, the synchronization circuit 130 can alternatively reside in one of the memory controllers 120 (e.g., a master memory controller such as memory controller 120-1). Thus, a single memory controller 120 can control operation of all other memory controllers 120 to control accesses to memory array 140.

Note that in other embodiments, functionality associated with the synchronization circuit 130 can be distributed throughout each of the memory controllers 120. In such embodiments, the memory controllers 120 arbitrate amongst themselves to coordinate data accesses via respective data buses.

As discussed briefly above, the memory controllers 120 receive commands from the host system 110 initiating memory operations and exchanges of data. During a memory access operation, synchronization circuit 130 provides timing signals to indicate to the memory controllers 120 when to perform operations such as clock in data or initiate a respective control signal to write data to memory array 140. Proper timing of operations amongst the multiple memory controllers 120 prevents interference among the memory controllers 120 and promotes efficient accesses of data from memory array 140. Note that the memory array can be configured to include memory modules in accordance with form factors specified by the JEDEC standards body.

Figure 2:
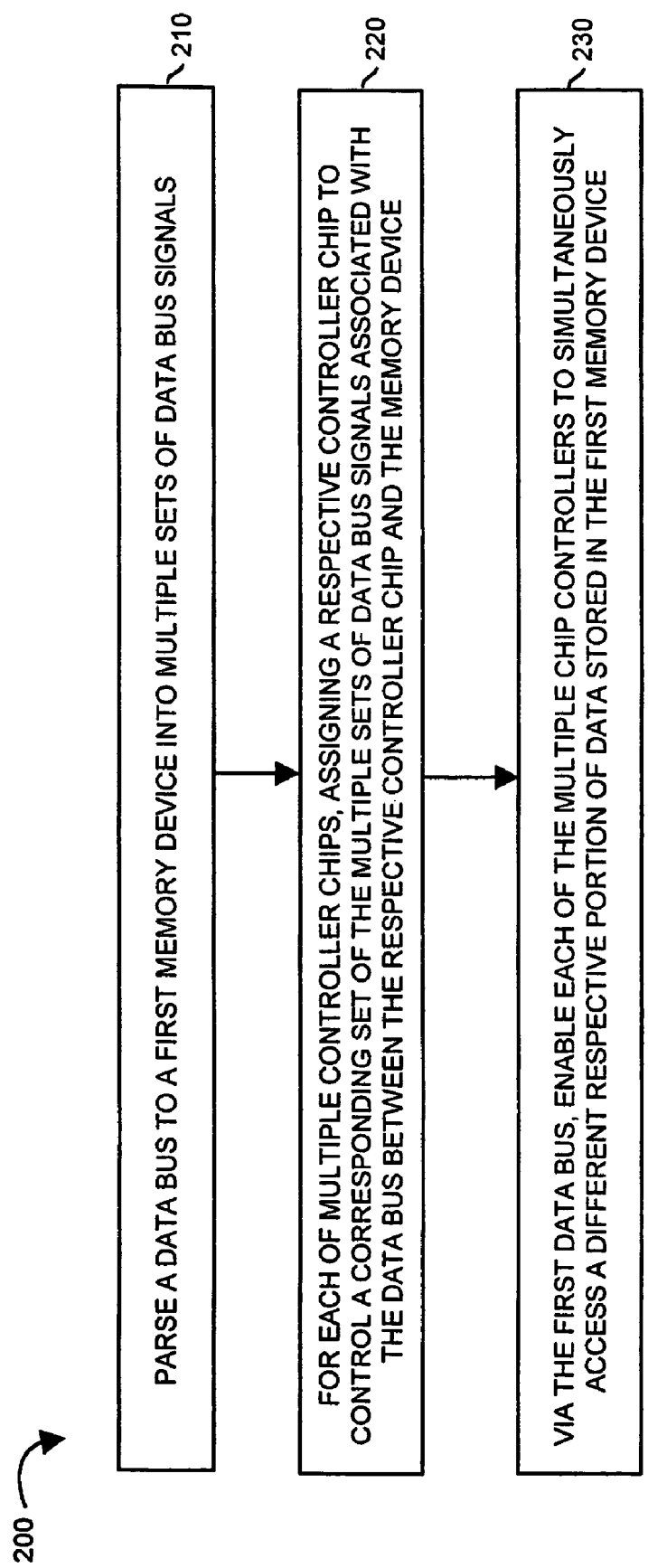
FIG. 2 is a flowchart illustrating a technique of assigning control of respective portions of a common data bus to multiple memory controller chips according to an embodiment herein.

FIG. 2 is a flowchart 200 illustrating a general technique for apportioning control of a multi-bit bus according to embodiments herein. Note that the following discussion will occasionally reference the resources as previously discussed.

In step 210, an entity (e.g., a circuit board layout tool, memory system designer, a manufacturing facility, printed circuit board layout engineer, etc.) producing memory system 100 parses a respective data bus (e.g., data bus A) to a given memory device into multiple sets of data bus signals. For example, if data bus A is 64 bits wide, then the entity parses the data bus A into M portions, where M is an integer value. The portions may or may not be equal in size.

In step 220, for each of multiple controller chips 120, the entity assigns a respective controller chip 120 to control a corresponding set of the multiple sets (e.g., portions) of data bus signals associated with the data bus A between the respective controller chips 120 and a memory device in memory array 140. As an example, assume that the portions are equal in size and that M=4 and data bus A includes 64 bits. In the context of this example, the entity assigns memory controller 120-1 to control data bits D1 through D16 of data bus A; memory controller 120-2 to control data bits D17 through D32 of data bus A, . . . and memory controller 120-M to control data bits D49 through D64 of data bus A.

In step 230, the entity enables each of the multiple chip controllers 120 to simultaneously access a different respective portion of data stored in the first memory device via use of data bus A. For example, in addition to configuring connections (e.g., printed circuit board traces) between memory controllers 120 and a memory device of memory array 140, the entity provides synchronization circuit 130 to synchronize the multiple controller chips 120 for purposes of enabling simultaneous access of different portions of data on data bus A from the from memory array 140 at the same time. As previously discussed, the synchronization circuit 130 can reside external with respect to the memory controllers 120 or reside within one or more of the memory controllers 120. As a whole, the date accessed by memory controllers can be a 64 bit value.

Figure 3:
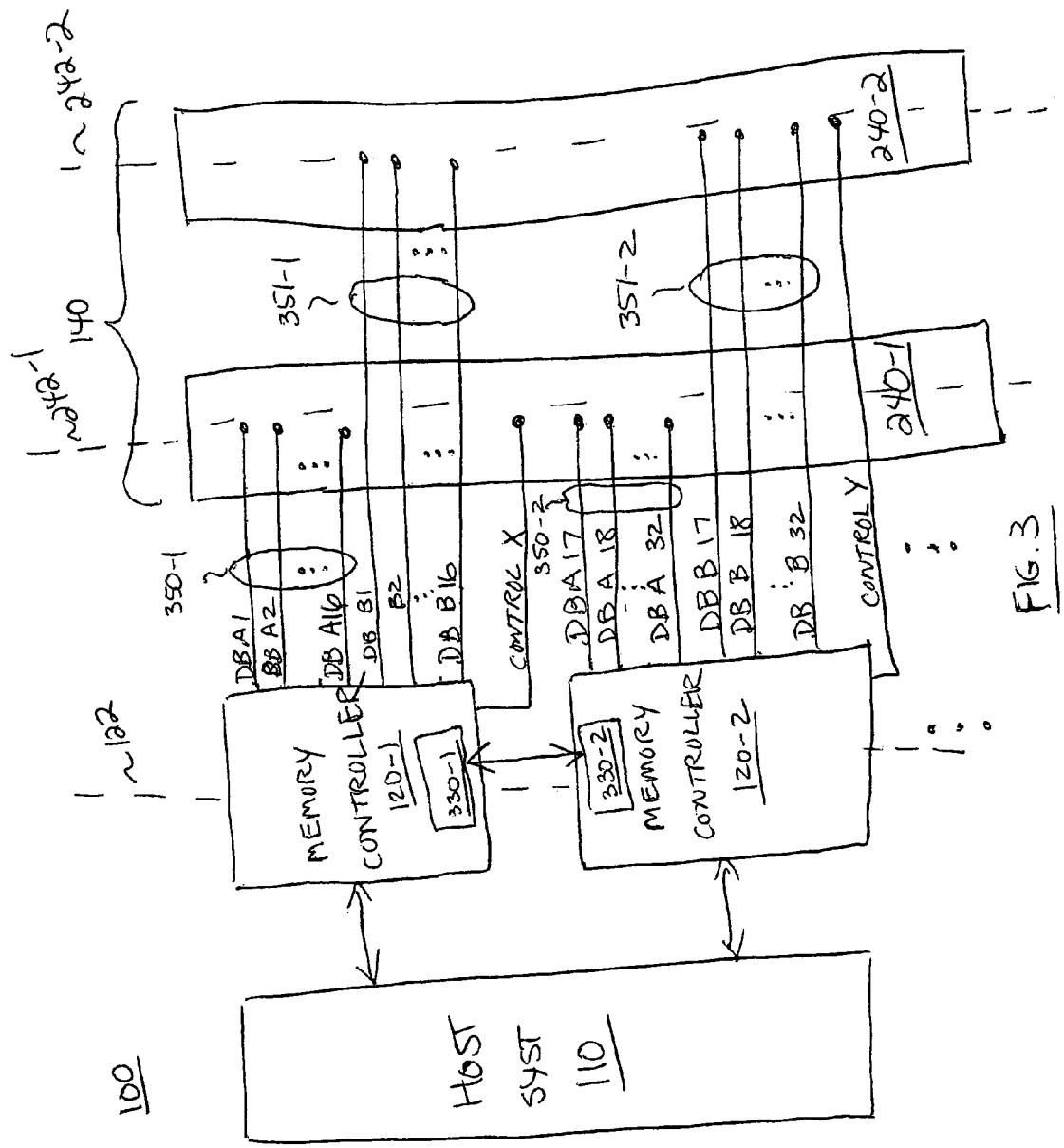
FIG. 3 is a block diagram of a memory system including multiple memory devices according to an embodiment herein.

FIG. 3 is a diagram illustrating more specific details of memory system 100 according to embodiments herein. As shown, memory system 100 includes resources as discussed above with respect to FIG. 1. However, FIG. 3 further illustrates that memory array 140 includes memory devices (e.g., memory device 240-1 and memory device 240-2) such as memory modules. In the context of the present example, functionality associated with synchronization circuit 130 has been implemented in synchronization circuit 330-1, synchronization circuit 330-2, . . . for purposes of coordinating operations amongst memory controllers 120 to access memory devices in a manner as previously discussed.

In one embodiment, memory devices 240 are DIMMs (Dual In-line Memory Modules), each comprising a series of random access memory integrated circuits. These integrated circuits are typically mounted on a printed circuit board and designed for use in personal computers and other types of processing systems.

Physically, the pins on memory device 240-1 and memory device 240-2 are positioned along respective lengthwise axes 242 of the memory devices 240. In other words, memory device 240-1 physically can be a relatively narrow device having many corresponding pins (e.g., data bus, address bus, etc.) positioned along a respective lengthwise axis 242-1. In a similar manner, memory device 240-2 also can be a relatively narrow device having many corresponding pins (e.g., data bus, address bus, etc.) positioned along a respective lengthwise axis 242-2. Embodiments herein include laying out the memory controllers 120 (e.g., separate controller chips) along a layout axis 122 that is substantially parallel with respect to lengthwise axes 242 of the memory devices 240.

As shown in FIG. 3, laying out memory controllers 120 along layout axis 122 enables relatively simple routing of traces from memory controllers 120 to each of the memory devices 240. That is, routing of traces for data bus A is straightforward because nodes (e.g., pins) on a given memory controller 120 and corresponding nodes (e.g., pins) on a respective memory device 240-1 are in fairly close proximity to each other. If memory controllers 120 were packaged as a single controller chip as done in conventional methods, routing of traces could be near impossible because of the density of traces in such a small printed circuit board area.

In one embodiment, a trace layout engineer arranges memory controller 120-1 on or near a first position of the layout axis 122. The trace layout engineer arranges memory controller 120-2 to be on or near a second position of the layout axis. After positioning of memory controllers 120 on layout axis 122, the trace layout engineer implements a first set of conductive paths (e.g., group of traces 350-1) between memory controller 120-1 and the memory device 240-1. Additionally, the trace layout engineer implements a second set of conductive paths (e.g., group of traces 350-2) between memory controller 120-2 and memory device 240-1.

As discussed above, embodiments herein include spreading out control of signals amongst multiple controller chips spaced along a layout axis 122. Positioning of memory controllers 120 along layout axis 122 in parallel with lengthwise axes 242 of memory devices 240 enables groups of traces 350 and 351 between the memory controllers 120 and the memory devices 240 to be of approximately the same length or range of lengths. For example, as a result of the layout shown in FIG. 3, respective trace lengths associated with the group of traces 350-1 (e.g., a portion of data bus A) between memory controller 120-1 and memory device 240-1 can be approximately the same length as a group of traces 350-2 (e.g., a portion of data bus A) between memory controller 120-2 and memory device 240-1. In a similar manner, respective trace lengths associated with the group of traces 351-1 (e.g., a portion of data bus B) between memory controller 120-1 and memory device 240-2 can be approximately the same length as a group of traces 351-2 (e.g., a portion of data bus B) between memory controller 120-2 and memory device 240-2. Thus, embodiments herein include laying out traces between memory controllers 120 and memory devices 240 such that trace lengths of corresponding groups of traces are of substantially similar or the same length.

In further embodiments, the trace layout engineer and/or circuit board designer enables each of the multiple chip controllers to simultaneously access different respective portions of data stored in the memory devices 240 while a single one of memory controllers 120 controls the address and control signals to a respective memory device 240. In the context of the present example, memory controller 120-1 drives control signals X (e.g., an address bus, strobes, enable signals, etc.) associated with memory device 240-1. Each of memory controllers 120 accesses data bus A at the same time. Synchronization circuit 330-1 (e.g., a master memory controller) can provide notification to the other memory controllers 120 when to access the data bus A. Thus, one embodiment herein includes enabling each of multiple controller chips to simultaneously access a respective portion of data from the memory device 240-1 while the memory controller 120-1 controls the address bus associated with the first memory device.

In a similar manner, memory controller 120-2 can be configured to control signals Y (e.g., address bus, strobes, etc.) associated with memory device 240-2. Synchronization circuit 330-1 (e.g., a master memory controller) can provide notify memory controller 120-2 when and potentially how to control signals Y to memory device 240-2. Thus, one embodiment herein includes a synchronization circuit that enables each of the multiple controller chips to simultaneously access a respective portion of data from the memory device 240-2 while the memory controller 120-2 controls the address bus associated with the memory device 240-2.

Figure 4:
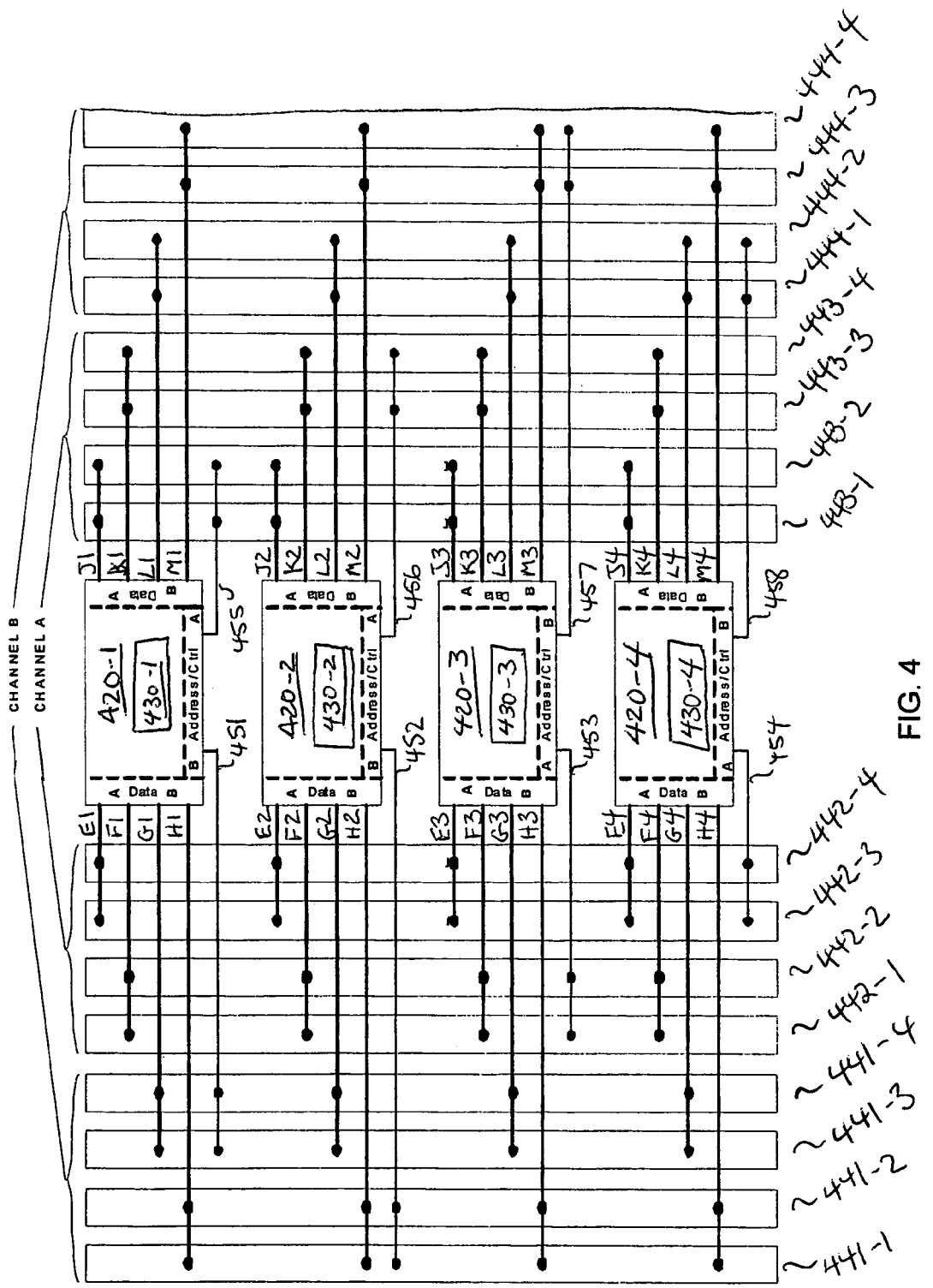
FIG. 4 is a block diagram of a memory system for accessing stored data according to an embodiment herein.

FIG. 4 is an example diagram illustrating memory system 400 according to embodiments herein. As shown, memory system 400 includes multiple memory controller chips 420 (e.g., memory controller chip 420-1, memory controller chip 420-2, memory controller chip 420-3, and memory controller chip 420-4), and corresponding groups of memory modules 441, 442, 443, and 444. Synchronization circuits 430 (e.g., synchronization circuit 430-1, synchronization circuit 430-2, synchronization circuit 430-3, and synchronization circuit 430-4) coordinate memory operations amongst memory controllers 420. Each memory module can be a DIMM (Dual In-Line Memory Module) or other memory device having a multi-bit address and data bus for accessing stored data. Group of memory modules 441 includes memory module 441-1, memory module 441-2, memory module 441-3, and memory module 441-4. Group of memory modules 442 includes memory module 442-1, memory module 442-2, memory module 442-3, and memory module 442-4. Group of memory modules 443 includes memory module 443-1, memory module 443-2, memory module 443-3, and memory module 443-4. Group of memory modules 444 includes memory module 444-1, memory module 444-2, memory module 444-3, and memory module 444-4. As shown, channel B includes group of memory modules 441 and 444 for storing data. Channel A includes group of memory modules 442 and 443 for storing data.

Memory system 400 includes multiple data buses including data bus E, data bus F, data bus G, data bus H, data bus J, data bus K, data bus L, and data bus M. Data bus E can include data bus portion E1, data bus portion E2, data bus portion E3, and data bus portion E4. Data bus F includes data bus portion F1, data bus portion F2, data bus portion F3, data bus portion F4. Data bus G includes data bus portion G1, data bus portion G2, data bus portion G3, data bus portion G4. Data bus H includes data bus portion H1, data bus portion H2, data bus portion H3, data bus portion H4. Data bus J includes data bus portion J1, data bus portion J2, data bus portion J3, data bus portion J4. Data bus K includes data bus portion K1, data bus portion K2, data bus portion K3, data bus portion K4. Data bus L includes data bus portion L1, data bus portion L2, data bus portion L3, data bus portion L4. Data bus M includes data bus portion M1, data bus portion M2, data bus portion M3, data bus portion M4. Each data bus portion can include one or more data signals to access data in respective memory modules.

Memory system 400 also includes groups of control signals such as group of control signals 451, group of control signals 452, group of control signals 453, group of control signals 454, group of control signals 455, group of control signals 456, group of control signals 457 and group of control signals 458. Each group of control signals can include appropriate signals to support controlling a respective memory module to access data. For example, each group of control signals can include one or more of the following signals to control a respective memory module: reset signals, clocks, data strobes, chip selects, command inputs, enables, etc.

In one embodiment, memory system 400 includes a cluster of four memory controllers 420 and sixteen standard registered memory modules. Note that the memory system 400 can be replicated to provide increased storage capacity. For example, a yet larger memory system can include four of the memory systems as shown in FIG. 4.

Cluster of memory controllers 420 implements two separate sets of data access interfaces—one for channel A and channel B. Each channel can have 64 data bits and 8 check bits split across the cluster of memory controllers 420. Companion data strobe signals can be distributed accordingly across the cluster of memory controllers 420 as well. In one embodiment, the protocol for the access interfaces is defined by JEDEC standard JESD79-2A.

Note that in order to meet timing and synchronization requirements, data and check bits can be split across the cluster in groups of four memory controllers 420 along with the nibble's companion data strobe signal. Splitting of check bits across the cluster need not be a clean division by four. For example, certain memory controllers 420 can support more nibble/strobe sets than others for a given channel. Also, note that implementations of memory system 400 can be specifically designed to support modules with memory devices that adhere to data-to-strobe ratio of a 4:1 in order to achieve maximum memory capacity per channel.

Address and control signals can be handled in a different manner. For example, each memory controller 420 can implement two separate address and control interfaces. For example, memory controller 420-1 can include group of control signals 451 associated with a first respective interface and group of control signals 455 associated with a second respective interface. As shown, each interface can be connected to two of the sixteen memory modules. One of such interfaces is for channel A and the other for channel B.

A single memory access (read, write, etc.) can be made to either channel A or channel B by accessing four of sixteen memory modules. For example, in such an embodiment, a host system issues a command and corresponding companion data (for writes) to the cluster of memory controllers 420. In a synchronized manner, via use of synchronization circuits 430, an appropriate one of the memory controllers 420 issues the host's command to the memory modules on the channel of interest. The four modules addressed by the memory controllers 420 respond accordingly. The memory controllers 420 share a responsibility of reading or writing data to the appropriate memory modules. If the access is a read, the memory controllers 420 coordinate amongst themselves and forward accessed portions of data back to a host system requesting the data from memory.

A transfer of data from the memory controllers 420 to the host can be achieved in a parallel manner. For example, for a given data access, each of the memory controllers 420 can retrieve two bytes (e.g., sixteen bits) of data from a corresponding accessed memory module for the given address. Via synchronization circuits 430, the memory controllers 420 can support a parallel transfer of the sixty-four bits of retrieved information for the given address to the host.

Synchronization

As previously discussed, synchronization circuits 430 (either in single one of memory controllers 420 or distributed throughout multiple memory controllers 420) coordinate data transfers from memory controllers 420 to memory modules. For example, a synchronization circuit 430-1 in master memory controller such as memory controller 420-1 (via synchronization circuit 430-1) sends messages to the other three memory controllers (e.g., memory controller 420-2, memory controller 420-3, and memory controller 420-4) to indicate the beginning of a new command cycle to the memory modules. The three receiving memory controllers 420 can detect occurrence of errors and send corresponding messages back to the master memory controller 420-1 indicating the occurrence of errors.

In one embodiment, the synchronization circuit 430-1 includes a 2.5 volt (e.g., low voltage Complementary Metal Oxide Semiconductor) interface running at 100 MegaHertz.

The master memory controller 420-1 can include 6 output signals and 6 input signals. Each slave memory controller (e.g., memory controllers 420-2, 420-3, and 420-4) can include two output signals and two input signals. Thus, one embodiment herein includes a connection of four traces (e.g., 2 traces or signal lines for supporting a flow of data from memory controller 420-1 and 2 traces or signal lines supporting a flow of data to memory controller 420-1) between memory controller 420-1 and each of memory controllers 420-2, 420-3, and 420-4.

According to one configuration, each of memory controllers 420 can simultaneously access four memory modules when performing a respective data access (e.g., Dynamic Random Access Memory access). When simultaneously accessing four memory modules, four control interfaces including four respective address buses work in a lock step manner. For example, to accomplish the synchronization of accesses to the four memory modules (e.g., 4 DIMMs), the master memory controller 420-1 waits until it observes that the 3 slave memory controllers (e.g., memory controllers 420-2, 420-3, and 420-4) are ready to execute a command with respect to the channel via SYNC_IN signals associated with synchronization circuits 430. In other words, the master memory controller 420-1 monitors the above-mentioned signals received from memory controllers 420-2, 420-3, and 420-4. When the memory controller slaves are ready, the master memory controller 420-1 signals the slave memory controllers to begin execution of an access operation via SYNC_OUT signals associated with the synchronization circuits 430. In other words, memory controller 420-1 communicates over the above-mentioned traces to the memory controllers 420-2, 420-3, and 420-4 to support simultaneous operations. The master memory controller 420-1 itself can begin after waiting a fixed amount of time (e.g., 2 cycles) after providing the above signaling to the slave memory controllers.

The above signaling can be duplicated such that each of channel A and channel B work in a similar manner. For example, as discussed above, the synchronization circuits 430 can include a separate set of synchronization signals for each of channel A and B operating in the DRAM clock domain to account for any clock phase shift between channels.

Physical Characteristics

According to one configuration, the memory controllers 420 are implemented in FPGA (Field Programmable Gate Array) devices. Selection of such devices for use in memory system 400 can be based on a desire: (1) that a respective package size of memory controllers 420 is small enough so that a linear array of four memory controller 420 approximates a length of a standard memory module; (2) that I/O capacity of each memory controller 420 supports approximately one-fourth of each of two memory data buses; (3) that I/O capacity associated with each memory controller completely supports two address and control interfaces to a respective memory module; (4) that each respective slave memory controller supports I/O capacity between itself and the master memory controller 420-1 for synchronization purposes; (5) that each memory controller include I/O capacity to support system interfaces to a host device; (6) that memory system 400 includes logic capacity and features sufficient to support other functional aspects as discussed in this disclosure.

Using memory controllers 420 having a small form factor (e.g., small package size) enables direct connections between a respective memory controller and memory module. Accordingly, the respective trace lengths of the data buses can be kept to a minimum length. Additionally, use of memory controllers 420 having a smaller form factor can reduce the number of layers required in a respective printed circuit board.

According to one configuration, routing of memory channel signals (e.g., traces implementing data buses E, F, G, . . . , K, L, M can be done using so-called stripline technology. In such a configuration, the signals are sandwiched between two plane layers of a respective circuit board.

It should be noted that, where applicable, certain techniques (such as trace layout, printed circuit board design, etc.) described herein can be implemented via application of a respective computer system including a processor and corresponding software code to carry out the embodiments discussed in this specification. An example of such an embodiment (e.g., a computer system executing software code) can include an interconnect that couples a memory system and a processor of the computer system. Execution of code stored in the memory can support one or more of the techniques as described herein.

Figure 5:
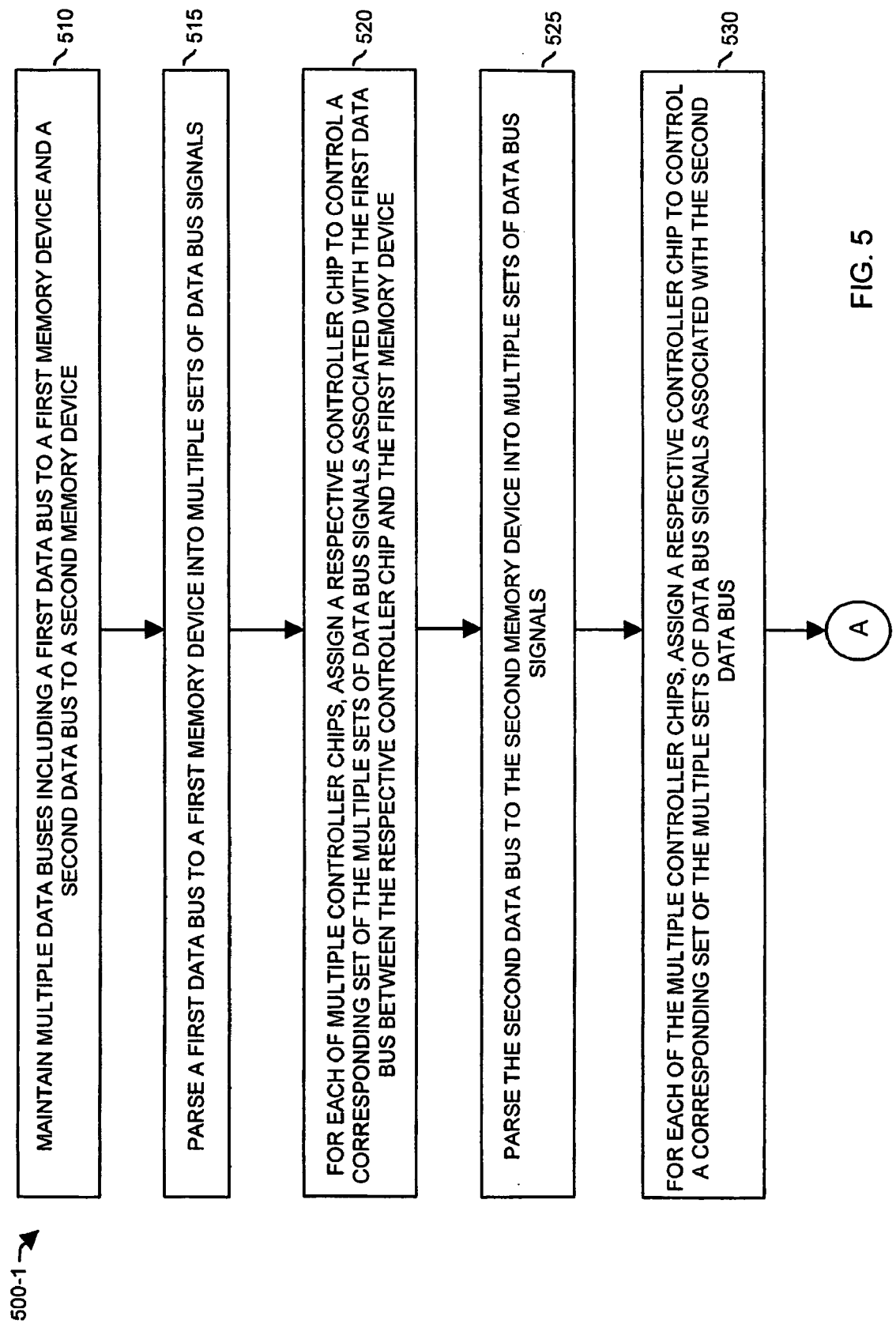

FIGS. 5 and 6 combine to form flowchart 500 (e.g., flowchart 500-1 and flowchart 500-2) illustrating a technique of laying out circuit board components and use of corresponding printed circuit board traces according to embodiments herein.

In step 510 of FIG. 5, the entity (e.g., a circuit board layout tool, a layout engineer, printed circuit board manufacturing facility, memory system designer, etc.) allocates or maintains multiple data buses including a first data bus (e.g., data bus A) to access a first memory device (such as a first DIMM) in memory array 140 and a second data bus (e.g., data bus B) to access a second memory device (such as a second DIMM) in memory array 140.

In step 515, the entity parses the first data bus (e.g., data bus A) into multiple sets (e.g., groupings) of data bus signals. For example, a first set of signals can include data bits 1-16 of data bus A, a second set of signals can include data bits 17-32 of data bus A, a third set of signals can include data bits 33-48 of data bus A, and a fourth set of signals can include data bits 49-64 of data bus A.

In step 520, for each of multiple controllers 120, the entity assigns a respective controller 120 to control a corresponding set of the multiple sets of data bus signals associated with the first data bus (e.g., data bus A) between the respective controller 120 and the first memory device (e.g., first DIMM).

In step 525, the entity parses the second data bus (e.g., data bus B) into multiple sets (e.g., groupings) of data bus signals. For example, a first set of signals can include data bits 1-16 of data bus B, a second set of signals can include data bits 17-32 of data bus B, a third set of signals can include data bits 33-48 of data bus B, and a fourth set of signals can include data bits 49-64 of data bus B.

In step 530, for each of multiple controllers 120, the entity assigns a respective controller 120 to control a corresponding set of the multiple sets of data bus signals associated with the second data bus (e.g., data bus B) between the respective controller 120 and the second memory device (e.g., second DIMM).

In step 535, the entity provides a synchronization circuit 130 associated with the multiple memory controllers 120 to synchronize the multiple memory controllers 120 for purposes of enabling simultaneous access of different portions of data from the first memory device at the same time. The synchronization circuit 130 also can coordinate operations associated with the memory controllers 120 such that the memory controllers 120 can simultaneously access different portions of data from the second memory device at the same time.

In step 540, the entity assigns memory controller 120-1 of the multiple memory controllers 120 to control an address bus (e.g., control signals X) associated with the first memory device.

In step 545, the entity assigns memory controller 120-2 of the multiple memory controllers 120 to control an address bus (e.g., control signals Y) associated with the second memory device.

In step 550, the entity configures the memory controllers 120 to support a simultaneous parallel transfer of the different respective portions of the data retrieved from the first memory device to a target destination such as host system 110.

As discussed, techniques herein are well suited for use in applications such as data processing systems that utilize DIMM (Dual In-line Memory Module) memory parts in which corresponding pins are physically distributed in a sequential fashion along a length of the respective device. However, it should be noted that configurations herein are not limited to use in such applications and thus configurations herein and deviations thereof are well suited for other applications as well.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A method for controlling multiple data buses including a first data bus to a first memory device and a second data bus to a second memory device, the method comprising:
    splitting the first data bus to the first memory device into multiple sets of first data bus signals;
    for each of multiple controller chips, assigning a respective controller chip to control a corresponding set of the multiple sets of the first data bus signals associated with the first data bus between the respective controller chip and the first memory device;
    splitting the second data bus to the second memory device into multiple sets of second data bus signals;
    for each of the multiple controller chips, assigning a respective controller chip to control a corresponding set of the multiple sets of the second data bus signals associated with the second data bus between the respective controller chip and the second memory device;
    via the first data bus, enabling each of the multiple chip controllers to simultaneously access a different respective portion of data stored in the first memory device;
    via the second data bus, enabling each of the multiple chip controllers to simultaneously access a different respective portion of data stored in the second memory device; and
    synchronizing the multiple chip controllers for purposes of enabling simultaneous access of different portions of data from the first memory device at the same time and enabling simultaneous access of different portions of data from the second memory device at the same time;
    wherein enabling each of the multiple chip controllers to simultaneously access the different respective portions of data stored in the first memory device includes:
        assigning a first controller chip of the multiple controller chips to control a first address bus and first control bus associated with the first memory device; and
    wherein enabling each of the multiple chip controllers to simultaneously access the different respective portions of data stored in the second memory device includes:
        assigning a second controller chip of the multiple controller chips to control a second address bus and second control bus associated with the second memory device,
    enabling the first and second controller chips to simultaneously access a respective portion of data from the first memory device while the first controller chip controls the first address bus and first control bus associated with the first memory device; and
    enabling the first and second controller chips to simultaneously access a respective portion of data from the second memory device while the second controller chip controls the second address bus and second control bus associated with the second memory device.

2. A method as in claim 1 further comprising:
    configuring the controller chips to support a simultaneous parallel transfer of the different respective portions of the data retrieved from the first memory device to a target destination.

3. A method as in claim 1 further comprising:
    laying out the controller chips along a layout axis that is substantially parallel with respect to lengthwise axes of the first memory device and the second memory device.

4. A method as in claim 1, wherein enabling each of the multiple chip controllers to simultaneously access a different respective portion of data stored in the first memory device includes:
    laying out the controller chips along a layout axis that is substantially parallel with respect to a lengthwise axis of the first memory device.

5. A method as in claim 4, wherein laying out the controller chips along the layout axis includes:
    arranging a first controller chip of the controller chips on a first position of the layout axis;
    arranging a second controller chip of the controller chips on a second position of the layout axis;
    implementing a first set of conductive paths between the first controller chip and the first memory device; and
    implementing a second set of conductive paths between the second controller chip and the first memory device.

6. A method as in claim 5, wherein implementing the first set of conductive paths and the second set of conductive paths includes:
    configuring corresponding conductive path lengths associated with the first set of conductive paths between the first controller chip and the first memory device to be substantially similar in lengths to corresponding conductive path lengths associated with the second set of conductive paths between the second controller chip and the first memory device.

7. A system comprising:
    a first data bus split up into multiple sets of first data bus signals;

multiple memory controller chips, each of which is assigned to control a corresponding set of the multiple sets of first data bus signals to a first memory device; and the first data bus enabling each of the multiple chip controllers to simultaneously access a different respective portion of data stored in the first memory device, a second data bus split up into multiple sets of second data bus signals, each of the multiple memory controller chips being assigned to control a corresponding set of the multiple sets of second data bus signals to a second memory device; and a synchronization circuit to coordinate operations associated with the multiple memory controller chips, wherein signaling associated with the synchronization circuit enables the multiple chip controllers to simultaneously access a different respective portion of data stored in the second memory device via the second data bus;

wherein a first controller chip of the multiple controller chips is configured to control a first address bus and corresponding first control bus associated with the first memory device; and wherein a second controller chip of the multiple controller chips is configured to control a second address bus and corresponding second control bus associated with the second memory device.

8. A system as in claim 7, where in the multiple memory controller chips are configured to support a simultaneous parallel transfer of the different respective portions of the data retrieved from the first memory device to a target destination.

9. A system as in claim 7, wherein the multiple memory controller chips are laid out along a layout axis on a printed circuit board that is substantially parallel with respect to lengthwise axes of the first memory device and the second memory device; and wherein the first memory device includes pins positioned along a corresponding lengthwise axis of the first memory device; and wherein the second memory device includes pins positioned along a corresponding lengthwise axis of the second memory device.

10. A system as in claim 7, wherein the multiple memory controller chips are arranged along a layout axis of a circuit board that is substantially parallel with respect to a lengthwise axis of the first memory device.

11. A system as in claim 10, wherein:

a first controller chip of the multiple controller chips resides at a first position of the layout axis;

a second controller chip of the multiple controller chips resides at a second position of the layout axis;

a first set of conductive paths connects the first controller chip to the first memory device; and a second set of conductive paths connects the second controller chip to the first second memory device.

12. A system as in claim 11, wherein:

corresponding conductive path lengths associated with the first set of conductive paths between the first controller chip and the first memory device are configured to be substantially similar in lengths to corresponding conductive path lengths associated with the second set of conductive paths between the second controller chip and the first memory device.

* * * * *